June 17, 1952 — J. M. BRUNSTAD — 2,600,474
LIQUID COOLER
Filed Feb. 17, 1949 — 2 SHEETS—SHEET 1
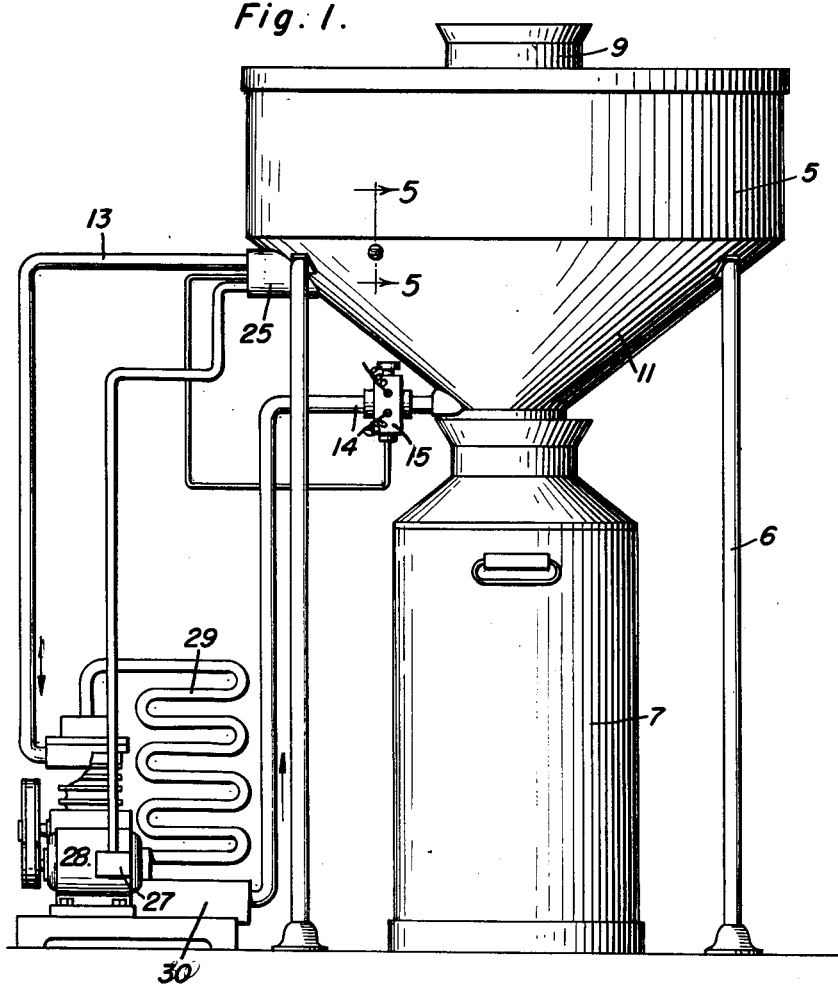
Fig. 1. Fig. 4. Fig. 5.
Inventor
Julius M. Brunstad
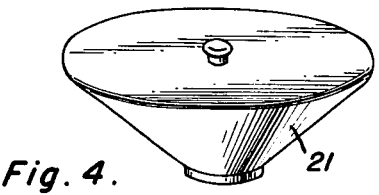 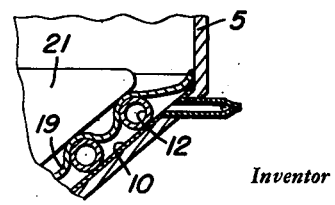
By Clarence A. O'Brien and Harvey B. Jacobson, Attorneys June 17, 1952  J. M. BRUNSTAD  2,600,474
LIQUID COOLER Filed Feb. 17, 1949  2 SHEETS—SHEET 2

Inventor
Julius M. Brunstad
Attorneys

Patented June 17, 1952

2,600,474

UNITED STATES PATENT OFFICE 2,600,474

LIQUID COOLER

Julius M. Brunstad, Colfax, Wis.

Application February 17, 1949, Serial No. 76,871

5 Claims. (Cl. 62—141)

The present invention relates to new and useful improvements in cooling devices and more particularly to a cooler for milk or other liquids.

An important object of the invention is to provide a cooler constructed in the form of a funnel for filling milk cans and through which the milk passes in a spiral path surrounded by a cooling coil through which a cooling agent circulates for quickly and uniformly cooling the milk as the same passes through the funnel.

Another object is to provide a thermostatically controlled valve for regulating the volume of refrigerant passing through the coil and a thermostatically controlled switch for a motor operated pump for the refrigerant.

A further object is to provide a liquid cooling funnel which may be conveniently and thoroughly cleaned with little effort.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 4 is a perspective view of the removable cone; and

Figure 5 is a fragmentary sectional view taken on a line 5—5 of Figure 1.

Figure 2:
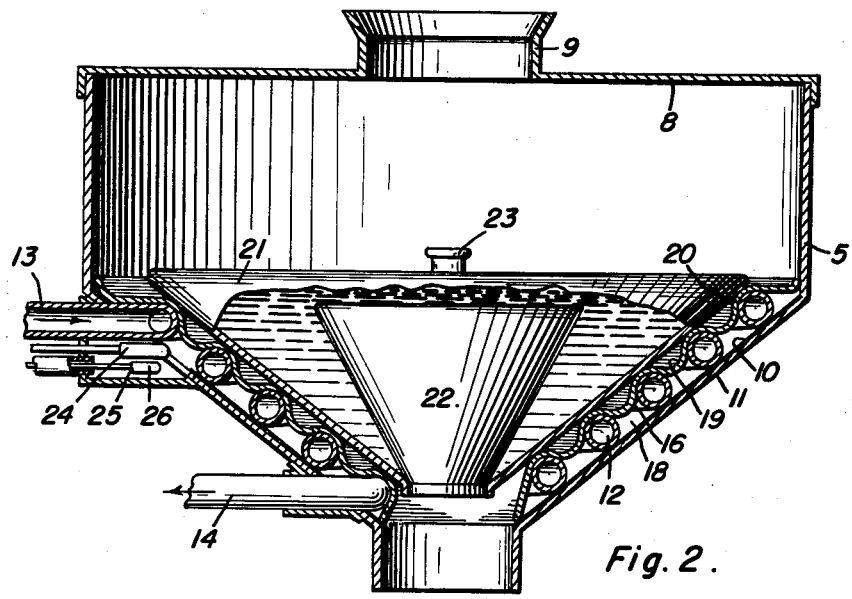
Figure 2 is a vertical sectional view.
Figure 3:
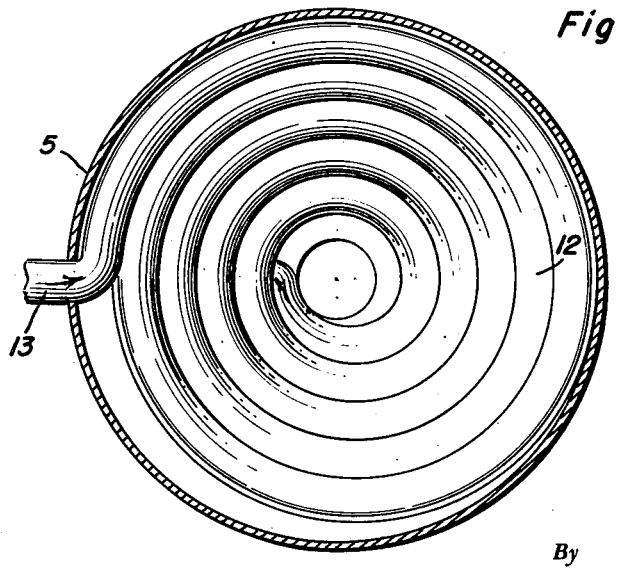
Figure 3 is a top plan view of the cooling coil.

Referring now to the drawings in detail wherein, for the purpose of illustration, I have disclosed a preferred embodiment of my invention, the numeral 5 designates a funnel supported on legs 6 and under which a milk can 7 or other receptacle is removably placed. The top of the funnel is closed by a removable cover 8 having a filling neck 9.

A lining 10 of insulation material is suitably secured in the tapered lower portion 11 of the funnel and a spiral coil 12 is also suitably secured at the inside of tapering portion 11 of the funnel with an inlet pipe 13 at the upper convolution of the coil and a return pipe 14 at the lower convolution, said pipes extending outwardly at one side of the funnel. The pipes 13 and 14 are connected to a suitable refrigeration system commonly known as a dry expansion system and which includes a compressor 28 to which refrigerant is returned from coil 12 by pipe 13; a condenser 29 at the delivery end of the compressor; and a liquid receiver 30 at the delivery end of the condenser and which is filled with liquid refrigerant under pressure from the condenser. The pipe 14 leads from receiver 30 to coil 12 and is provided with a thermostatically controlled regulating valve 15. Fluid flow in the system is as follows: refrigerant is compressed in the compressor and discharged to the condenser; stored in the receiver and delivered therefrom to expansion valve 15 in pipe 14, and then to coil or evaporator 12 and back to the compressor.

The coil 12 is enclosed in a hollow wall 16 at the tapering portion of the funnel which is sealed at its upper and lower edges to the outer wall of the funnel to provide a dead air chamber 18 in which the coil is housed and from which air is evacuated in any suitable manner. The surface of hollow wall 16 is formed with a spiral groove 19 which projects between the convolutions of coil 12 and forms a spiral ridge 20 separating the convolutes of the groove.

A hollow frusto-conical plug 21 is fitted in the funnel to rest against the ridges 20 of the wall 16 to close the surface of spiral groove 19 to provide a spiral passage under plug 21.

The plug is filled with a suitable liquid cooling agent such as "Freons;" or a solution of calcium chloride in water; or acetone and dry ice, and a body 22 is provided at the center of the plug. A combined handle and filler plug 23 rises from the top of the plug to facilitate its removal for cleaning the groove 19.

A thermostatic element of a conventional type 24 is positioned in housing 25 at one side of the funnel and exposed to changes in temperature in dead air chamber 18 and is connected to valve 15 for regulating the valve. A second thermostatic element 26 is also positioned in housing 25 for controlling a cut-off switch 27 connected to the motor of the pump.

In the operation of the device, a milk can 7 is placed under funnel 5 and milk poured into the top of the funnel will pass along spiral groove 19 in hollow wall 16 under plug 21 and into the can. A suitable refrigerant circulated in coil 12 will cool the milk as it travels along groove 19. The volume of refrigerant circulated in the coil is regulated by valve 15 controlled by thermostatic element 24 in accordance with variations in the temperature of the milk to cool successive supplies of milk uniformly, and thermostatically controlled switch 27 will cut on and off the pump for the refrigerant when the cooler is being used or idle.

By removing plug 21, the milk passage groove 19 may be easily and thoroughly cleaned.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A liquid cooler comprising a funnel-shaped body having a hollow wall, a cooling coil in the wall, said wall having a groove at the inside of the body for the passage of liquid from an upper to a lower portion of the body, and means positioned in the body against the hollow wall to confine the liquid in the groove to travel therein.

2. A liquid cooler comprising a funnel-shaped body having a hollow wall, a cooling coil in the wall, said wall having a groove at the inside of the body for the passage of liquid from an upper to a lower portion of the body, and a removable cover held against the hollow wall at the open side of the groove to hold liquid in the groove for traveling therein.

3. A liquid cooler comprising a funnel-shaped body having a hollow wall, a cooling coil in the wall, said wall having a groove at the inside of the body for the passage of liquid from an upper to a lower portion of the body, and a removable plug in the body covering the open side of the groove to hold liquid in the groove for traveling therein.

4. A liquid cooler comprising a funnel-shaped body having a hollow wall, a spiral cooling coil in the wall, a spiral groove at the inside of the body following the convolutions of the coil, and a removable plug in the body closing the open side of the groove to form a passage leading from an upper to a lower portion of the body.

5. A liquid cooler comprising a funnel-shaped body, a hollow conical-shaped plug positioned in the body and containing a liquid cooling agent, a cooling coil in the body and surrounding the plug, said body having an inlet in its top adapted to receive liquid to be cooled and an outlet in its bottom, and means forming a passage between the opposing faces of the plug and coil through which liquid flows from the inlet to the outlet.

JULIUS M. BRUNSTAD.

REFERENCES CITED

The following references are of record in the file of this patent:

UNITED STATES PATENTS

| Number | Name | Date |
|---|---|---|
| 1,321,106 | Kessler | Nov. 11, 1919 |
| 1,492,696 | Moericke | May 6, 1924 |
| 2,119,631 | Edwards | June 7, 1938 |
| 2,127,732 | Heitman | Aug. 23, 1938 |
| 2,450,735 | Millet | Oct. 5, 1948 |

FOREIGN PATENTS

| Number | Country | Date |
|---|---|---|
| 10,257 | Great Britain | Nov. 22, 1932 |